United States Patent [19]

Cohen

[11] 4,297,320
[45] Oct. 27, 1981

[54] COATING POLYMERIZATION REACTORS WITH THE REACTION PRODUCTS OF THIODIPHENOLS AND A BLEACH

[75] Inventor: Louis Cohen, Avon Lake, Ohio

[73] Assignee: The B. F. Goodrich Company, Akron, Ohio

[21] Appl. No.: 161,711

[22] Filed: Jun. 23, 1980

Related U.S. Application Data

[63] Continuation-in-part of Ser. No. 34,106, Apr. 30, 1979, abandoned.

[51] Int. Cl.$^3$ .................... B01J 19/00; B05D 7/22; C08F 2/00
[52] U.S. Cl. .................... 422/131; 422/241; 427/230; 427/239; 428/35; 526/62; 528/373; 528/391
[58] Field of Search .............. 422/131, 310, 241, 240, 422/187; 427/236, 239, 230; 428/35; 526/62, 74; 528/86, 99, 102, 106, 373, 391; 65/608

[56] References Cited

U.S. PATENT DOCUMENTS

| 4,024,330 | 5/1977 | Morningstar et al. | 427/230 X |
| 4,068,052 | 1/1978 | Weimer et al. | 526/62 |
| 4,080,173 | 3/1978 | Cohen | 428/35 X |
| 4,200,712 | 4/1980 | Cohen | 422/241 X |
| 4,200,726 | 4/1980 | Ishii et al. | 528/99 |
| 4,209,600 | 6/1980 | Tytgat et al. | 526/74 |
| 4,220,743 | 9/1980 | Englin | 422/131 X |
| 4,228,130 | 10/1980 | Cohen | 422/241 X |
| 4,255,470 | 3/1981 | Cohen et al. | 526/62 X |
| 4,256,864 | 3/1981 | Cohen | 526/62 |

Primary Examiner—Kenneth M. Schor
Attorney, Agent, or Firm—Roy P. Wymbs

[57] ABSTRACT

This invention relates to a polymerization reaction vessel having a coating on the inner surfaces thereof resulting from applying thereto an aqueous coating composition containing the reaction product of a thiodiphenol, or a derivative thereof, with a bleaching agent or material, such as, for example, sodium hypochlorite (NaOCl). When polymerizing olefinic monomers, such as vinyl halides, vinylidene halides, and vinylidene monomers having at least one terminal $CH_2=C<$ group, and mixtures thereof, polymer buildup on the inner surfaces of the reaction vessel is substantially reduced. Multiple charges or batches of polymer can be made in said internally coated reaction vessel without opening the same between charges thus preventing the escape of unreacted monomer(s) to the surrounding atmosphere.

16 Claims, No Drawings

COATING POLYMERIZATION REACTORS WITH THE REACTION PRODUCTS OF THIODIPHENOLS AND A BLEACH

CROSS REFERENCE TO RELATED APPLICATION

This application is a continuation-in-part of U.S. patent application Ser. No. 034,106, filed Apr. 30, 1979, and now abandoned.

A related application for U.S. patent is Ser. No. 953,989, filed Oct. 23, 1978 in the name of Louis Cohen, and now U.S. Pat. No. 4,228,130.

BACKGROUND OF THE INVENTION

Various type chemical processes are commonly carried out in large, stirred vessels which are frequently provided with auxiliary equipment, such as baffles, agitator equipment, heat transfer coils which enable heat to be supplied or extracted from the contents of the vessels, and the like. In many cases, however, such processes eventually produce undesirable deposits on the surfaces of the equipment with which the reaction mixtures come into contact. Such deposits interfere with the efficient transfer of heat to and from the interior of the vessels. Further, these deposits have a tendency to deteriorate and to partially fragment resulting in contamination of the reaction mixture and the products produced therefrom. This problem is particularly prevalent in polymerization type reactions, since the deposits, or buildup, of solid polymer on reactor surfaces not only interferes with heat transfer, but decreases productivity and adversely affects polymer quality.

The polymer buildup problem is particularly troublesome in the commercial production of polymers and copolymers of vinyl and vinylidene halides, when polymerized alone or with other vinylidene monomers having a terminal $CH_2=C<$ group, or with polymerizable polyolefinic monomers. For example, when polymerizing vinyl chloride and other comonomers when used, the same are maintained in the form of discrete droplets in an aqueous suspension system by the use of suspending agents and agitation. When the reaction is complete, the resultant polymer, or PVC, is washed and dried. However, these suspension systems are often unstable and during the polymerization reaction vinyl chloride polymer builds up on the inner surfaces of the reactor. Obviously, this polymer buildup must be removed since it results in further formation of polymer buildup which in turn results in a crust formation that adversely affects heat transfer and contaminates the polymer being produced.

Various methods have heretofore been proposed to reduce the amount and nature of polymer buildup on polymerization reactor surfaces, such as solvent cleaning, various hydraulic and mechanical reactor cleaners and the like. While the various methods and apparatus have done an acceptable job, none has proven to be the ultimate in polymer buildup removal. Various coating materials have been proposed for coating the internal surfaces of the reactor which materials are resistant to polymer buildup. For example, in U.S. Pat. No. 4,080,173 there is shown and described the use of self-condensed polyhydric phenols and polyhydric naphthols as coatings to prevent polymer buildup. While these coating materials give good to excellent results, there is still a need to improve on these materials, particularly in reducing the concentration of the material in the coating solutions and also in reducing the color in the coating solution.

SUMMARY OF THE INVENTION

It has been found that when the interior surfaces of a polymerization reactor are coated with an aqueous coating solution containing the reaction product of a thiodiphenol, or a derivative thereof, with a bleaching agent or material, such as, for example, sodium hypochlorite (NaOCl), polymer buildup on said interior surfaces of the reactor is substantially reduced or eliminated. Due to the nature of the coating solution, and the coating material contained therein, it can be applied to the inner surfaces of the reactor without opening the same thus providing a closed polymerization system. In polymerizing the monomers in such a coated polymerization vessel or reactor, the same is done in an aqueous polymerization medium which is kept in contact with said coated surfaces throughout the polymerization reaction.

DETAILED DESCRIPTION

In accordance with the present invention, a film or coating of a coating material, made by reacting a thiodiphenol, or a derivative thereof, as hereinafter defined, with a bleaching material or agent, is applied to the inner surfaces of a polymerization reactor or vessel by merely contacting said surfaces with an aqueous solution of said coating material. All exposed surfaces in the interior of the reactor, such as the baffles, agitator or mixing mechanism, condensers, when the same are used, etc., are likewise coated in the same manner. After the coating solution has been applied to the inner surfaces of the reactor, the polymerization medium can be introduced to the reactor and the reaction started without the necessity of drying said surfaces beforehand. However, in many cases it is preferred, when after the application of the coating solution to the inner surfaces, that the surfaces are rinsed with water, such as by spraying, filling the reactor and draining, and the like, thereby, surprisingly, leaving on said surfaces a tightly adhering coating or film of the coating material which is not affected by the polymerization medium even though said medium is vigorously agitated during the polymerization reaction.

Various bleaching materials or agents may be reacted with the thiodiphenols and derivatives thereof, such as chlorine, hypochlorites and chloramines, and chlorite and chlorine dioxide. The preferred bleaching materials or agents for use in the present invention are the hypochlorites, and in particular, sodium hypochlorite (NaOCl). The reaction is fairly simple and involves forming an alkali metal salt of the thiodiphenol, or derivative thereof, such as with sodium hydroxide, and the like, and then reacting said salt in an aqueous medium with the bleaching material while using good agitation.

The useful thiodiphenols and derivatives thereof, for making the coating solutions for the practice of the present invention, are those compounds represented by the following generic formula:

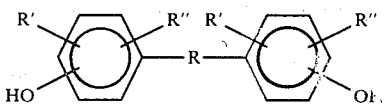

wherein R is —S—; or

R' is —H; —OH; or an alkyl group containing from 1 to 4 carbon atoms; and R" is —H or —Cl. As examples of compounds having said generic formula, there may be named 2,2'-thiodiphenol, 3,3'-thiodiphenol, 4,4'-thiodiphenol, 2,2'-dimethyl-4,4'-thiodiphenol, 3,3'-dimethyl-4,4'-thiodiphenol, and the like.

In order to form the reacted coating materials of the present invention, the thiodiphenol, or derivative, is first formed into the alkali metal salt. This is accomplished by dissolving, with stirring, the thiodiphenol, or derivative, in an aqueous alkali metal or ammonium hydroxide solution at a temperature in the range of about 5° C. to about 50° C. This solution will contain from about 2.0% to about 10.0% by weight as thiodiphenol and will have a pH in the range of about 10 to about 13 and the intermediate product need not be recovered. Then a separate aqueous solution containing about 2% to about 10% by weight of a bleaching material or agent, for example, NaOCl, is made up at a temperature in the range of about 5° C. to about 50° C. Then the latter solution is slowly added to the former solution with good agitation at a temperature in the range of about 5° C. to about 50° C. The final molar ratio of bleaching material or agent to thiodiphenol will be in the range of about 0.1 to about 2.0 and preferably in the range of about 0.4 to about 0.8. The resultant solution containing the reacted product is the master coating solution and will have a pH in the range of about 10 to about 13. This master coating solution is then further diluted with water to give a coating solution for application to the reactor surfaces having a total solids content, based on the weight of the thiodiphenol, or derivative thereof, reaction product in the range of about 0.1% to about 5% by weight. Preferably, the final coating solution will contain from about 0.3% to about 1% by weight of the coating material as dry product. The pH of the final coating solution can be adjusted by means of an acid, such as hydrochloric acid, so as to fall within the range of about 7.5 to about 13, particularly, for example, when the coating solution being adjusted has a solids content of about 1.0% or about 0.5% or less. When adjusting the pH with HCl, for example, a precipitate forms locally but redissolves rapidly, when using certain materials and adjusting to a pH down to about 9.5. When going below a pH of 9.5, some of the components come out of solution but in the form of colloidially stable particles having a size of about 0.2 micron and the colloidal suspension is still usable as a coating material. When going below a pH of 7.5, the precipitated particles are too large and the resultant suspension or dispersion is not useful as a coating solution. It is to be noted that the pH of the coating solution is affected by the kind and number of substituent groups attached to the aromatic nuclei of the coating material and the cation used to form the salt of the thiodiphenol or derivative thereof, such as Na, K, Li, NH$_4$, and the like.

In order to prevent polymer buildup in a polymerization reactor, it is essential that the inner surfaces thereof are water-wettable. An ordinary solid surface, such as stainless steel, is non water-wettable due to the normal contamination of said surfaces with organic materials through contact with the atmosphere. The surfaces can be cleaned, such as with chromic acid or an abrasive cleanser, for example, and it will become water-wettable. However, such cleaning alone does not solve the problem since the surfaces will not remain clean for a sufficient length of time, that is, for more than the duration of a single polymerization reaction. This necessitates recleaning the surface after each polymerization cycle. Therefore, applying a coating to the surfaces which will be water-wettable and resist polymer buildup thereon and remain on said surfaces throughout multiple reaction cycles is most desirable.

When a metal or solid surface is non-wettable, a liquid thereon, such as water, will form droplets and not flow out into a smooth film. The angle formed between the tangent of the side of the droplet and the metal or glass surface is called the "contact angle" and is referred to as "theta" ($\theta$). A further measurment of the wettability of a solid surface is the critical surface tension for wetting a solid surface and is expressed as "$\gamma_c$". The $\gamma_c$ is measured in dynes per centimeter. Using water as the standard, in order for a solid surface to be wettable, $\theta$ must equal zero or be very close to it, and $\gamma_c$ must be 72 dynes/cm. or greater.

More importantly, the material being applied to the surface should not only form a wettable surface, but also form a layer or film thereof which is not readily removable. This film adheres to the solid or metal surface by adsorption and in many cases, the film is a mono-layer of the coating material applied which is of the order of a molecule in thickness. These films of such thickness are invisible to the naked eye thus eliminating any color problem, such as is the problem with many coatings heretofore used for the same purpose. Of course, films of greater thickness can result when using higher solids content coating solutions, in accordance with the present invention, which films or coatings are visible to the naked eye. The film or layer formed by the coating solution is not removable by washing with water. That is to say, the coating or film is resistant to removal from the surfaces when a turbulent aqueous reaction medium is in contact therewith, caused by the agitation of the polymerization mixture in the reactor.

The coating solution is usually applied to the inner reactor surfaces by spraying it on. However, it is also possible to apply the coating solution by flooding the reactor and then draining, or painting or brushing on, but spraying is the most practical and economical method of application. After spraying the coating solution on the inner surfaces and draining the reactor, the polymerization reaction can be started immediately without further treatment of said surfaces. However, it has been found that excellent results are obtained when after applying the coating solution to the inner surfaces of the reactor, the coated surfaces are sprayed with water and the reactor drained prior to charging the reactor with the polymerization mixture or recipe. It should also be pointed out that the coatings defined herein work equally well on glass or metal surfaces, such as stainless steel, and the like.

One important aspect of the present invention is that the multiple polymerizations may be run without opening the reactor between charges since, with the spray nozzle or nozzles mounted at strategic points on the reactor, it is possible to reach all inner surfaces thereof while the reactor is closed. Although multiple charges may be run in a coated reactor without recoating the surfaces, it has been found to be expeditious, and preferred, to recoat the internal surfaces of the reactor periodically after several charges have been run therein, or after each charge, to insure uniform and efficient production. When it is decided to recoat the reactor, the reactor is drained and the inner surfaces of the reactor are flushed with water. The coating solution is applied to the surfaces, preferably by spraying, and the reactor is drained of the excess coating solution in such a way that the same can be sent to a recovery system, if desired. Then, optionally, the surfaces having the coating thereon are sprayed with water and the effluent is discarded, or recovered if desired. Thereafter, the reactor is charged with the polymerization medium and ingredients in the usual manner and the reaction commenced immediately with no particular modification of processing techniques being required due to the presence of the coating. It is understood, of course, that one can recoat the reactor as often as desired without opening the same, even after every charge is polymerized. Further, utilization of the internally coated reaction vessel of the present invention does not adversely affect the heat stability or other physical and chemical properties of the polymers produced therein.

For the purpose of simplicity of description, the present invention is described in terms of the use of NaOCl as the bleaching material or agent reacted with thiodiphenols and derivatives thereof and the use of such reaction products as a coating material in conjunction with the polymerization of vinyl chloride. It is to be understood, of course, that this is merely intended in an illustrative and not a limitative sense.

While the present invention is specifically illustrated with regard to the suspension polymerization of vinyl chloride, it is to be understood that the process and apparatus may likewise be applied in the dispersion, emulsion, or suspension polymerization of any polymerizable ethylenically unsaturated monomer or monomers where undesirable polymer buildup occurs. Examples of such monomers are other vinyl halides and vinylidene halides, such as vinyl bromide, vinylidene chloride, etc.; vinylidene monomers having at least one terminal $CH_2=C<$ grouping, such as esters of acrylic acid, for example methyl acrylate, ethyl acrylate, butyl acrylate, octyl acrylate, cyanoethyl acrylate, and the like; vinyl acetate; acrylonitrile; esters of methacrylic acid, such as methyl methacrylate, butyl methacrylate, and the like; styrene and styrene derivatives including α-methyl styrene, vinyl toluene, chlorostyrene; vinyl naphthalene; diolefins including butadiene, isoprene, chloroprene, and the like; and mixtures of any of these types of monomers and other vinylidene monomers copolymerizable therewith; and other vinylidene monomers of the types known to those skilled in the art.

The present invention, however, is particularly applicable to the suspension polymerization of vinyl chloride, either alone or in a mixture with one or more other vinylidene monomers having at least one terminal $CH_2=C<$ grouping copolymerizable therewith in amounts as great as about 80% or more by weight, based on the weight of the monomer mixture, since polymer buildup in the reaction vessel is a bad problem here.

The polymerization process is usually conducted at a temperature in the range of about 0° C. to about 100° C. depending upon the particular monomer or monomers being polymerized. However, it is preferred to employ temperatures in the range of about 40° C. to about 70° C. since, at these temperatures, polymers having the most beneficial properties are produced. The time of the polymerization reaction will vary from about 2 to about 15 hours.

The polymerization process may be carried out at autogenous pressures although superatmospheric pressures of up to 10 atmospheres or more may be employed with some advantage with the more volatile monomers. Superatmospheric pressures may also be employed with those monomers having the requisite volatilities at reaction temperatures permitting reflux cooling of the reaction mixture.

Further, the polymerization process may be carried out utilizing a full reactor technique. That is, the reaction vessel is completely filled with the polymerization medium and kept that way throughout the reaction by constant addition thereof of water of additional make-up liquid containing the monomer or monomers in the same proportions as at start-up. Upon the addition of a certain perdetermined amount of liquid, the polymerization reaction is terminated, usually by the addition thereto of a short-stopping agent. The ncessity for the addition of liquid is due to the shrinkage in volume of the reaction medium produced by the conversion of the monomer or monomers to the polymeric state.

In order to rate the various coatings, there has been devised a rating scale with respect to "paper" and "sandy" buildup. An uncoated reactor, where normal amounts of both types of buildup occur, is given a rating of 1.5. Any rating below 1.0 is good or a definite improvement. In other words, 0.0 rating is perfect, and so on.

To further illustrate the present invention, the following specific examples are given. In the examples, all parts and percents are by weight unless otherwise indicated.

EXAMPLE I

In this example, the following were mixed together at a temperature of 23° C. with stirring to form a clear solution having a pH of 11.95.

| (A.) | 4,4'-thiodiphenol(TDP) | 10 gms. |
| | NaOH | 10 gms. |
| | H$_2$O (demineralized) | 880 gms. |

One hundred grams of Solution (B.), which was an aqueous solution of 5.25% NaOCl at a pH of 10.7, was added to (A.) slowly with stirring at room temperature. The resultant solution was amber colored and had a pH of 12. The pH of the resultant reaction product coating solution was adjusted to 10.45 with hydrochloric acid. The solids content of the coating solution was 1% by weight as TDP. Thereafter, the inner surfaces of a three liter polymerization reactor equipped with a stirrer, which had been previously cleaned with an abrasive cleanser, were coated with said coating solution by spraying on the surfaces and then rinsing with water. The coating had a $\gamma_c$ greater than 72 dynes/cm. After coating the following recipe was charged to the coated reactor:

| | |
|---|---|
| Vinyl chloride | 1000 gms. |
| Water (demineralized) | 2055 gms. |
| 88% hydrolyzed polyvinyl acetate | 0.5 gm. |
| di-secondary butyl peroxy dicarbonate | 0.5 cc. |

A full reactor technique was used in the polymerization, sufficient water being added to keep the reactor full throughout the reaction cycle. The temperature of the reaction was maintained at 57° C. and the reaction medium was stirred. Water was added to the reactor as the reaction mixture shrank because of the formation of polyvinyl chloride (PVC). Upon the addition of 400 grams of water, the reaction was discontinued. After removal of the contents of the reactor, in usual fashion, the internal surfaces were rinsed with water, then re-coated and rinsed with water and a second charge made and polymerized in the same manner as above. The same procedure was again repeated in making a third charge. The reactor surfaces were evaluated after each charge. The results of the buildup ratings were as follows:

| | Buildup | |
|---|---|---|
| Charge No. | Paper | Sandy |
| 1 | 0.1 | 0 |
| 2 | 0.4 | 0 |
| 3 | 0.2 | 0.1 |

These results show the superiority of the coated reactor of the present invention over the control, or uncoated reactor which, as stated above, has a buildup rating of 1.5 for both paper and sandy.

The present invention has many advantages, principal among which is the ability to use very dilute coating solutions in polymerization reactors and still substantially reduce polymer buildup. By the use of dilute coating solutions, the adverse color problem is eliminated and the economics are greatly improved. Another advantageous feature of the present invention is the ease with which the coating material is prepared, that is, by a novel nearly instantaneous reaction in water at, or near, room temperature. Further, the present invention enables one to operate a closed reactor system thus eliminating the escape of any unreacted monomer into the surrounding atmosphere of the plant, which could be injurious to health. Numerous other advantages of the present invention will be apparent to those skilled in the art.

While the present invention has been described in terms of its specific embodiments, certain modifications and equivalents will be apparent to those skilled in the art and are intended to be included within the scope of the present invention, which is to be limited only by the scope of the appended claims.

I claim:

1. A process for substantially eliminating the buildup of polymers on the internal surfaces of a polymerization reaction vessel which comprises applying to said surfaces an aqueous coating solution having a pH in the range of about 7.5 to about 13.0 and containing the reaction product of a thiodiphenol and and a chlorine containing bleaching agent, said thiodiphenol having the general structure

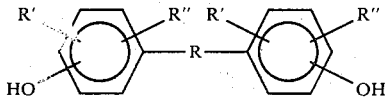

wherein R is selected from the group consisting of —S—, and

R' is selected from the group consisting of —H, —OH, and an alkyl group containing from 1 to 4 carbon atoms, and R" is —H or —Cl, and conducting the polymerization of monomer(s) while in contact with the coated internal surfaces of said vessel.

2. A process as defined in claim 1 wherein the monomer is vinyl chloride.
3. A process as defined in claim 1 wherein the thiodiphenol is 4,4'-thiodiphenol.
4. A process as defined in claim 1 wherein the thiodiphenol is 2,2'-thiodiphenol.
5. A process as defined in claim 1 wherein the thidiphenol is 3,3'-thiodiphenol.
6. A process as defined in claim 1 wherein the thiodiphenol is 2,2'-dimethyl-4,4'-thiodiphenol.
7. A process as defined in claim 1 wherein the thiodiphenol is 3,3'-dimethyl-4,4'-thiodiphenol.
8. A process as defined in claim 1 wherein the bleaching agent is sodium hypochlorite.
9. A process as defined in claim 1 wherein the polymerization of the monomer(s) is conducted at a temperature in the range of about 10° C. to about 80° C.
10. A process as defined in claim 1 wherein the monomers are vinyl chloride and vinyl acetate.
11. A process as defined in claim 2 wherein the thiodiphenol is 4,4'-thiodiphenol.
12. A process as defined in claim 11 wherein the bleaching agent is sodium hypochlorite.
13. A process as defined in claim 12 wherein the polymerization is conducted at a temperature in the range of about 10° C. to about 80° C.
14. A polymerization reaction vessel having on all the internal surfaces thereof a coating comprised of the reaction product of a thiodiphenol and a chlorine containing bleaching agent, said thiodiphenol having the general structure

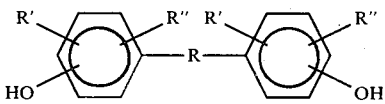

wherein R is selected from the group consisting of —S—, and

R' is selected from the group consisting of —H, —OH, and an alkyl group containing from 1 to 4 carbon atoms, and R" is —H, or —Cl, and wherein the coated surfaces are characterized by having a critical surface tension of at least 72 dynes/centimeter and a contact angle with water of about zero.

15. A polymerization reaction vessel as defined in claim 16 wherein the coating is comprised of the reaction product of 4,4'-thiodiphenol and a bleaching agent.

16. A polymerization reaction vessel as defined in claim 14 wherein the coating is comprised of the reaction product of 4,4'-thiodiphenol and sodium hypochlorite.

* * * * *